United States Patent [19]

Kerpes et al.

[11] Patent Number: 5,292,865
[45] Date of Patent: Mar. 8, 1994

[54] PROCESS FOR PREPARATION AND AFTER-TREATMENT OF POLYESTER PELLETS

[75] Inventors: Hans Kerpes, Grossheubach; Ulrich Thiele, Bruchkoebel, both of Fed. Rep. of Germany

[73] Assignee: Zimmer Aktiengesellschaft, Frankfurt, Fed. Rep. of Germany

[21] Appl. No.: 985,842

[22] Filed: Dec. 3, 1992

[30] Foreign Application Priority Data

Jul. 15, 1992 [DE] Fed. Rep. of Germany ....... 4223197

[51] Int. Cl.$^5$ .................................................. C08F 6/10
[52] U.S. Cl. ..................................... 528/492; 528/502; 528/503
[58] Field of Search ................................ 528/480–481, 528/492, 502, 503

[56] References Cited

U.S. PATENT DOCUMENTS

| | | | |
|---|---|---|---|
| 3,840,632 | 10/1974 | Maxion et al. | 264/130 |
| 4,223,128 | 9/1980 | Halek et al. | 528/481 |
| 4,230,819 | 10/1980 | Hauenstein et al. | 528/483 |
| 4,263,425 | 4/1981 | Rothe et al. | 528/309 |
| 4,374,975 | 2/1983 | Duh | 528/272 |
| 4,609,721 | 9/1986 | Kirschenbaum et al. | 528/285 |

*Primary Examiner*—John Kight, III
*Assistant Examiner*—Sam A. Acquah
*Attorney, Agent, or Firm*—Allegretti & Witcoff, Ltd.

[57] ABSTRACT

Process for simultaneous removal of aldehyde, solid-phase postcondensation and drying of linear polyesters and copolyesters by after-treating the polyester pellets with a diffusion surface of 1.95 to 2.90 m$^2$/kg, an individual pellet weight of 5 to 15 mg and a bulk density of 750 to 900 kg/m$^3$ at 140° to 210° C. with a flow of a dry gas mixture consisting of 60–90 vol % $N_2$, 5–21% $O_2$ and 0.1–25% $CO_2$ (total 100%) at a quantity ratio of 0.5 to 2.5 kg/h gas mixture per kg/h polyester.

6 Claims, No Drawings

PROCESS FOR PREPARATION AND AFTER-TREATMENT OF POLYESTER PELLETS

BACKGROUND OF THE INVENTION

This invention concerns a process for producing and after-treating pellets of linear polyesters or copolyesters, especially a heat treatment for simultaneous dealdehydization, solid-phase postcondensation and drying.

PRIOR ART

All known linear polyesters or copolyesters are produced today in principle by adjusting the polyester melt to a moderate degree of viscosity during polycondensation. The feasible and economically reasonable intrinsic viscosity of polyethylene terephthalate, for example, and its low modified copolyesters is in the range of 0.55 to 0.65 dL/g in the conventional stirred vessel autoclaves, or in the range of 0.55 to 0.85 dL/g in discontinuous annular disk autoclaves and in the range of 0.55 to 0.95 dL/g in continuous annular disk autoclaves.

On the one hand, it is hardly possible to achieve an intrinsic viscosity of more than 0.68 dL/g, especially in conventional autoclaves. Producing a high viscosity in an annular disk reactor entails a significant restriction in capacity while, on the other hand, polyesters for packaging materials such as bottles and containers require a very low acetaldehyde content. So in the state of the art, melt polycondensation is followed by solid-phase condensation which generally leads to an increase in the intrinsic viscosity by 0.10 to 0.15 dL/g and a reduction in the residual aldehyde content of the pellets to less than 2.5 ppm. It is important that the acetaldehyde bound in the form of the vinyl ester, also known as depot aldehyde, be degraded to the extent that only a minimal amount of acetaldehyde is formed in the polyester during the injection molding process in which the polyester pellets are converted to parisons or blanks in forming polyester bottles. For bottled mineral water the bottle wall should contain less than 3 ppm detectable acetaldehyde. Accordingly, the pellets used to produce the bottles should contain less than 1 ppm free acetaldehyde and less than 12 ppm bound acetaldehyde.

Polyesters are usually processed to amorphous pellets in underwater pelletizers after melt polycondensation, so crystallization is generally necessary before solid-phase condensation which is usually performed at 200° to 230° C. in vacuo or under an inert gas, especially nitrogen (see, for example, U.S. Pat. Nos. 4,064,112, 4,161,578 and 4,370,302). In addition, the crystallized and postcondensed pellets are subjected to another drying immediately before further processing.

A disadvantage of this process is the high cost in terms of equipment and energy, especially for vacuum processors and the ongoing cost of inert gas, if applicable.

A method of removing aldehyde from polyethylene terephthalate by treating it with nitrogen or dry air is disclosed in U.S. Pat. No. 4,230,819. To achieve a sufficiently low residual aldehyde level, e.g., 1.5 ppm, treatment temperatures of about 230° C. are necessary. When using air, however, oxidative damage to the polyester must be expected at such high temperatures, and nitrogen causes additional costs.

U.S. Pat. No. 4,223,128 therefore rules out temperatures higher than 220° C. in solid-phase polycondensation in air. However, in order to assure the desired increase in viscosity at a lower temperature, this patent proposes the use of very large quantities of dry air with a dew point of $-40°$ to $-80°$ C. At the treatment temperature of 200° C. cited in the examples in this patent, however, oxidative damage to individual pellets cannot be ruled out in continuous industrial processes having a rather broad dwell time spectrum instead of a constant dwell time. In addition, use of such large volumes of air requires large equipment which is expensive and a high power consumption.

SUMMARY OF THE INVENTION

This invention is directed to the problem of simplifying the state of the art processes for production and aftertreatment of pellets of linear polyesters or copolyesters for production at a low cost for consumer materials and with reduced equipment expense and power consumption. At the same time, the acetaldehyde content and rate of reformation of acetaldehyde by the polyester product must conform to the requirements for use in food packaging, especially for bottles for carbonated mineral water, and whereby oxidative damage of even individual pellets must be prevented at all costs.

The present process is suitable for producing and after-treating pellets of partially crystalline linear polyesters or copolyesters consisting of one or more dicarboxylic acids or their methyl esters such as terephthalic acid, isophthalic acid, naphthalenedicarboxylic acid, 4,4'-bisphenyldicarboxylic acid and one or more diols such as ethylene glycol, propylene glycol, 1,4-butanediol, 1,4-cyclohexanedimethanol, neopentyl glycol, diethylene glycol, which are produced by continuous or discontinuous processes of esterification or ester exchange using the known catalyst with subsequent melt polycondensation in vacuo. In accordance with the market demand, ethylene terephthalate homopolymers and copolymers with a comonomer content of less than 10 wt % are preferred.

It has surprisingly been found that with polyester pellets having a specific surface area in the range of 1.95 to 2.90 m$^2$/kg, combined dealdehydization, drying and solid-phase condensation can be carried out under gentle process conditions in the presence of a gas mixture of 60–90 vol % $N_2$, 5–21 vol % $O_2$ and 0.1–25 vol % $CO_2$ (total 100%) under much more favorable economic conditions than described in U.S. Pat. No. 4,223,128, for example. The preferred specific surface areas in the range of 2.0 to 2.6 m$^2$/kg and a specific surface area of about 2.25 m$^2$/kg is especially preferred for the commercial embodiment.

The specific shape of the individual pellets is not critical, but regularly shaped compact pellets such as cubes, spherical shapes and ellipsoids are preferred in accordance with the commercially desired bulk density in the range of 750 kg/m$^3$ to 900 kg/m$^3$. The average weight of the individual pellets or granules may be varied, but a range of 5 to 15 mg per pellet, preferably 7 to 12 mg per pellet, is desired for practical handling of the pellets in the aforementioned sense.

The gas mixture to be used according to this invention may be synthesized from the individual components. Preferably, air enriched with $CO_2$ and optionally $N_2$ is used. If catalytic or thermal incineration is to be performed with the plant emissions in the area of a polyester synthesis plant (because of stringent environmental requirements), then the combustion exhaust gases that have been freed of entrained water can be used for the aftertreatment according to this invention.

The $CO_2$ concentration is not critical, so no subsequent correction of the $CO_2$ content of combustion exhaust gases is necessary. Otherwise, $CO_2$ values in the range of 0.5 to 15 vol % are preferred. Higher concentrations up to about 25 vol % do not cause any problem, but they do not yield any mentionable advantage either.

Although the process of U.S. Pat. No. 4,223,128 specifies at least 3.8, preferably 4.6 to 12.1, kg/hour air at a dew point of less than −30° C., preferably −40° to −80° C., which must be heated to 180° to 220° C., preferably 190° to 210° C., per kg/hour polyester for solid-phase condensation and removal of aldehyde, the process according to this invention uses only 0.5 to 2.5, preferably 1.0 to 1.5, kg/hour of the gas mixture at a dew point of less than −20° C., preferably −20° to −40° C., which must be heated only to 140° to 210° C., preferably 160° to 185° C., per kg per hour polyester. The flow rate of the gas mixture is 5 to 40 m/min, preferably 9 to 36 m/min.

The smaller volume of gas and lower temperature according to this invention mean smaller and therefore less expensive equipment at the same production level and a reduced power consumption for circulation and heating. Drying is also less expensive. The entrained heat of combustion exhaust gases can also be utilized.

However, the special requirements according to this invention with regard to the specific surface area of the polyester pellets do not have any effect on profitability. $CO_2$ is inexpensive and the amount required is low.

In the process according to this invention in comparison with the aforementioned U.S. Pat. No. 4,223,128, the same degree of polycondensation and degree of drying are achieved, and more favorable results with regard to removal of aldehyde are also achieved.

DETAILED DESCRIPTION

Starting with polyester with an intrinsic viscosity in the range of 0.45 to 0.95 dL/g, preferably 0.63 to 0.79 dL/g, the increase in intrinsic viscosity during the process of removal of aldehyde is 0.02 to 0.20 dL/g, preferably 0.04 to 0.08 dL/g (measured at 25° C. on a solution of 125 mg polyester in 25 mL of a mixture of phenol and 1,2-dichlorobenzene in a weight ratio of 3:2). The treated pellets have a free acetaldehyde content of less than 1 ppm, preferably less than 0.8 ppm, and a bound acetaldehyde content of less than 12 ppm, preferably less than 10 ppm.

The free acetaldehyde dissolved physically in the polyethylene terephthalate is determined as follows:

The ethylene terephthalate homopolymer or copolymer to be analyzed is ground after cooling with liquid nitrogen and the screen fraction smaller than 0.4 mm is used for the analysis. 2.0 g of the polyester sample to be determined are placed in a 30-mL bottle with a septum purged with nitrogen, the bottle is sealed and kept at 150° C. for 90 minutes. A 2-mL sample of the nitrogen-acetaldehyde gas mixture is removed from the gas space of the bottle through the septum, and the acetaldehyde content is determined by gas chromatography.

The chemically bound acetaldehyde present in the ethylene terephthalate polymer is also known as depot acetaldehyde and is determined as follows:

2.0 g of the ground and screened polyester sample as described above are placed in a 30 mL bottle with a septum, purged with nitrogen and 1.0 g distilled water is added. After sealing the bottle it is kept at 150° C. for 15 hours, then cooled to 90° C. and kept at this temperature for 90 minutes. The acetaldehyde content is determined by gas chromatography of a 2 mL sample as described above.

The residual moisture content of the treated granule is less than 0.003 wt %, so these pellets can be processed further directly without additional drying. However, if the pellets are stored in the interim for a long period of time, the moisture content may increase again.

The treatment according to this invention does not have any mentionable influence on the color of the pellets. The b color value determined according to Hunter on crystallized polyester pellets is usually 0.5 to 3.0, preferably 1.5 to 2.0 units higher after a heat treatment than before the heat treatment.

The treatment temperature in the range of 140° to 210° C. is also determined by the chemical composition of the polyester. Essentially, the temperature to be used is higher, the higher the melting point of the polyester. For polyethylene terephthalate and its low modified copolyesters a temperature in the range of 170° to 185° C., preferably about 180° C., is recommended.

The treatment time depends primarily on the residual acetaldehyde content to be achieved and is 2 to 20 hours, preferably 5 to 12 hours. Normally, 10 to 12 hours are needed to reduce the free acetaldehyde content to less than 1 ppm. In this period of time, an increase in intrinsic viscosity by 0.06 to 0.08 dL/g is also observed. Simultaneous drying of the pellets does not require longer treatment times.

Surprisingly, it has been found that by using the process according to this invention, the drying of the polyester pellets by the processors which may be necessary after interim storage can be carried out more rapidly and under milder conditions than with the conventional polyester pellets on the market today.

The gas mixture flowing through the polyester pellets during treatment can be removed and incinerated together with other emissions from the plant, for example, or discharged directly into the atmosphere if the latter option is admissible. Recycling after purification and drying is also possible. Any additional carbon dioxide formed in the removal of volatile organic compounds by incineration can remain in the gas mixture to be recycled. The moisture content need be reduced only to a dew point in the range of −20° to −40° C.

Untreated polyester pellets are normally in an amorphous state and have a great tendency to form agglomerates under the influence of heat. Therefore, the pellets must usually be subjected to crystallization before performing the treatment according to this invention.

This crystallization can be performed as described in the aforementioned patents by treating the pellets with a stream of gas at a temperature in the range of 150° to 210° C. for 0.5 to 3 hours in a fixed or fluidized bed reactor with a flow of gas through it or in a stirred crystallizer, a paddle crystallizer or a screw crystallizer. Air or the same gas mixture as used for the aftertreatment may be used for crystallization.

Further simplification of the process consists of modifying the preparation of the pellets from the melt in such a way as to obtain partially crystalline pellets that do not tend to stick when heated to temperatures above the glass transition temperature. This is accomplished by the fact that the polyester produced by melt polycondensation is shaped into strands while molten, these strands are then cooled at least at the surface to temperatures in the range of the glass transition temperature to 30° C. below the melting point and then drawn or stretched by a factor of at least 2 at this temperature, preferably drawn or stretched by a factor of 4 to 6 or even by a factor of 20 to 60 and then immediately chopped to form pellets. The procedure to be followed here is to adjust the temperature of the strands after stretching to the range from the glass transition temperature to 30° C. below the melting point because only in this way can the stretched polyester strand be cut cleanly. For polyethylene terephthalate and its low modified copolymers, the stretching temperature is preferably 90° to 130° C. and the cutting temperature is 90° to 220° C., in which case the cutting temperature is equal to or higher than the stretching temperature. Another advantage of this process is that partial removal of aldehyde occurs during the stretching process to an extent equivalent to the degradation of acetaldehyde observed during the conventional crystallization used with amorphous pellets. The pellets produced in this way can then be subjected directly to the aftertreatment according to this invention.

For example, while maintaining the basic specific surface area of the individual pellets according to this invention, it is also possible to perform polycondensation of polyester pellets for textile applications that must be dried before spinning by performing it in the melt phase only up to an intrinsic viscosity of 0.50 to 0.58 dL/g and increasing the molecular weight during drying up to the intrinsic viscosity of 0.61 to 0.66 dL/g that is conventional for spinning. This results in a significant increase in capacity.

When an intrinsic viscosity of 0.68 to 0.72 dL/g is established in the melt, dealdehydization to a residual acetaldehyde content of less than 1 ppm is of primary concern in the production of polyesters and copolyesters for beverage bottles. The increase in intrinsic viscosity to 0.76 to 0.80 dL/g which occurs at the same time is a welcome side effect.

Commercial inexpensive pellet dryers are sufficient for the aftertreatment according to this invention.

SPECIFIC EXAMPLES

Example 1

A low modified polyethylene terephthalate with 1.1 wt % diethylene glycol and 2.5 wt % isophthalic acid and an intrinsic viscosity of 0.670 dL/g was chopped to form regularly shaped pellets with a specific surface area of 2.25 m$^2$/kg and an average individual pellet weight of 10 mg and then crystallized continuously at 190° C. and with a dwell time of 109 minutes using dry air that had a dew point of −20° C. The weight ratio of air to pellets was 0.1 kg:1.0 kg per hour. Then the pellets were treated in a drying tube at a gas temperature of 180° C. and a pellet temperature of 184° to 187° C. with a gas mixture that had a dew point of −25° C. and contained 74.4 vol % N$_2$, 19.9 vol % O$_2$, 4.8 vol % CO$_2$ and 0.9 vol % noble gases and other gases. The weight ratio of the gas mixture to the pellets was about 1.0 kg:1.0 kg per hour and the average dwell time in the tube was 11 hours. The resulting average gas velocity was about 0.11 m/s based on the empty tube. The intrinsic viscosity had risen to 0.730 dL/g after the treatment. The free acetaldehyde content was measured as 0.6 ppm and a bound acetaldehyde content with 7 ppm.

Standard bottle parisons with a mold weight of 42 g produced on a 48-fold automatic injection molding machine from Husky had a free acetaldehyde content of 2.1 to 2.8 ppm (melting at 285° C., cycle time 18 seconds, screw backpressure 50%=47 bar).

Example 2

The polyester melt whose composition was the same as that described in Example 1 was subjected to polycondensation to an intrinsic viscosity of 0.790 dL/g on the average in a discontinuous annular disk reactor. Pellets with a specific surface area of 2.15 m$^2$/kg and an average individual pellet weight of 11 mg were prepared from the melt. Crystallization was performed at 185° C. with air, containing 3000 ppm moisture. The average dwell time was 109 minutes. The ratio of air to pellets was set at 0.1:1.

Then the pellets were treated in a drying tube at a gas temperature of 175° C. and a pellet temperature of 181° to 183° C. with a gas mixture consisting of about 78.1 vol % N$_2$, 18.7 vol % O$_2$, 2.2 vol % CO$_2$ and 1.0 vol % noble gases and other gases such that the gas mixture had a dew point of −25° C. The weight ratio of the gas mixture to the pellets was 1.0 kg:1.0 kg per hour and the average dwell time in the tube was 11 hours. The gas velocity thus established was about 0.11 m/s based on the empty tube. The intrinsic viscosity had risen to 0.830 dL/g after the treatment, whereby after crystallization with humid air the intrinsic viscosity had dropped from 0.79 dL/g originally to 0.76 dL/g. The free acetaldehyde content was measured as 0.7 ppm and the bound acetaldehyde content was measured as 10 ppm.

Standard bottle parisons with a mold weight of 42 g produced on a 48-fold automatic injection molding machine from Husky had a free acetaldehyde content of 2.5 to 3.4 ppm.

Example 3

The polyester melt from the annular disk reactor of Example 2 was shaped to form oval and amorphous strands ($d_{max}$ 4 mm, $d_{min}$ 3.5 mm). The strands were heated to 90° C. and drawn at a drawing ratio of 1:6 where the strand velocity before the drawing gap was 15 m/min and after the drawing gap was 90 m/min. The completely drawn strands were then heated to 150° C. and pelletized to form regular oval pellets with a specific surface area of 2.51 m$^2$/kg and an average weight of the individual pellets of 6 mg ($d_{max}$ 1.8 mm, $d_{min}$ 1.6 mm, l=1.8 mm).

The crystallinity after drawing was 39% (determined from density). The pellets were treated without further crystallization at 180° C. (for 11 hours) with a gas mixture of about 78.1 vol % N$_2$, 8.0 vol % O$_2$, 12.9 vol % CO$_2$ and 1.0 vol % noble gases and other gases and that had a dew point of −25° C. The weight ratio of the gas mixture to the pellets was 1 kg:1 kg per hour. After treatment, an intrinsic viscosity of 0.85 dL/g was measured.

The free acetaldehyde content was 0.4 ppm and the reformation of acetaldehyde (depot aldehyde) amounted to 6 ppm. After melting the pellets in an extruder, a free acetaldehyde content of 2.5 ppm was measured at a melting point of 285° C. and an average dwell time of the melt of 30 seconds.

Example 4

Comparative Example

The polyester melt with an intrinsic viscosity of 0.64 dL/g and having the same composition as that described in Example 1 was shaped to form pellets with a specific surface area of 1.89 m$^2$/kg. The average weight of the individual pellets was 17 mg. The pellets were crystallized as described in Example 1 and treated with the same gas mixture. The measured increase in viscosity amounted to 0.03 dL/g, and the free acetaldehyde content was 2.1 ppm and the bound acetaldehyde content was 14 ppm. Reformation of free acetaldehyde during a process of melting in the extruder at a melting temperature of 285° C. and a dwell time of the melt of 30 seconds amounted to 5.8 ppm.

Example 5

Comparative Example

Oval, uniform ethylene terephthalate polyester pellets (1.8 wt % DEG, $d_{max}$ 3.0 mm, $d_{min}$ 2.5 mm, l=3 mm) with an average weight of the individual pellets of 26 mg and a specific surface area of 1.45 m²/kg and an intrinsic viscosity of 0.63 dL/g were crystallized in a stream of nitrogen at a temperature of 218° C. and a dwell time of 109 min. The weight ratio of nitrogen to the pellets was 0.1 kg:1.0 kg per hour. The dew point of nitrogen was −20° C.

Then the pellets were treated with nitrogen at a temperature of 215° C. and at a resulting pellet temperature of 215° to 217° C. in a drying tube for 11 hours. The weight ratio of nitrogen to pellets was 1 kg:1 kg per hour and the dew point of the nitrogen was −25° C. The velocity of the gas that was established was about 0.11 m/s based on the empty tube. The intrinsic viscosity after the treatment was 0.76 dL/g. The free acetaldehyde content was measured as 2.3 ppm and the bound acetaldehyde was 12 ppm.

Standard bottle parisons with a mold weight of 42 g produced on a 48-fold automatic injection molding machine from Husky had a free acetaldehyde content of 3.5 to 5.0 ppm.

We claim:

1. Process for production and thermal after-treatment of pellets of ethylene terephthalate homopolymers or copolymers starting from polyesters having an intrinsic viscosity within the range of 0.45 to 0.95 dL/g, whereby less than 1 ppm free acetaldehyde and less than 12 ppm bound acetaldehyde are present in the after-treated pellets comprising the steps of a) partially crystallizing the polyester by extruding the polyester in a molten state to form strands,
cooling said strands to a temperature in the range of glass transition temperature to 30° C. below the melting point at at least the surface,
drawing said strands by a factor of at least 2 at said cooling temperature, and
immediately chopping into pellets said strands at a temperature in the range of said drawing temperature to 30° C. below the melting point
said pellets having a specific surface area in the range of 1.95 to 2.90 m²/kg,
an individual pellet weight in the range of 5-15 mg, and
a bulk density in the range of 750-900 kg/m³, and b) heating said pellets for 2 to 20 hours at a temperature of 140°-185° C. in the presence of a flowing gas mixture consisting of
60-90 vol % $N_2$,
5-21 vol % $O_2$,
0.5-25 vol % $CO_2$ (total 100%),
and having a dew point of less than −20° C.
the velocity of flow being 5-40 m/min at a quantity ratio of 0.5 to 2.5 kg/h of gas mixture per 1.0 kg/h polyester.

2. Process of claim 1 in which said starting polyesters have an intrinsic viscosity in the range of 0.63 to 0.79 dL/g.

3. Process according to claim 1 or 2 in which said partially crystallized pellets have a surface area in the range of 2.0 to 2.6 m²/kg and an individual pellet weight in the range of 7 to 12 mg.

4. Process of claim 1 in which said heating step is carried out at a temperature of 160°-185° C. and said gas mixture has a dew point of −20° to −40° C., a velocity of flow in the range of 9-36 m/min and a quantity ratio of 1.0 to 1.5 kg/h of gas mixture per 1.0 kg/h polyester.

5. Process of claim 1 in which said gas mixture comprises exhaust gases from incineration of the emissions for a polyester synthesis plant.

6. Process of claim 1 in which said drawing temperature is in the range of 90° to 130° C., and said chopping temperature is in the range of 90° to 220° C., said chopping temperature being equal to or higher than said stretching temperature.

* * * * *